United States Patent [19]
Jacobs et al.

[11] Patent Number: 6,047,285
[45] Date of Patent: Apr. 4, 2000

[54] METHOD FOR USING AN INDEX AS A WORKSPACE FOR DEFERRED ENFORCEMENT OF UNIQUENESS CONSTRAINTS

[75] Inventors: Kenneth R. Jacobs, San Mateo; Robert J. Jenkins, Foster City, both of Calif.

[73] Assignee: Oracle Corporation, Redwood Shores, Calif.

[21] Appl. No.: 09/056,392

[22] Filed: Apr. 6, 1998

Related U.S. Application Data

[63] Continuation of application No. 08/612,562, Mar. 8, 1996.
[51] Int. Cl.[7] .................................................. G06F 17/30
[52] U.S. Cl. .................................. 707/4; 707/3; 702/179
[58] Field of Search ............................... 707/201, 1, 103, 707/3, 4; 705/7; 702/179

[56] References Cited

U.S. PATENT DOCUMENTS

| | | | |
|---|---|---|---|
| 4,325,120 | 4/1982 | Colley et al. | 364/200 |
| 4,498,145 | 2/1985 | Baker et al. | 364/900 |
| 4,947,320 | 8/1990 | Crus et al. | 364/200 |
| 5,133,068 | 7/1992 | Crus et al. | 395/600 |
| 5,179,660 | 1/1993 | Devany et al. | 395/200 |
| 5,386,559 | 1/1995 | Eisenberg et al. | 395/600 |
| 5,495,601 | 2/1996 | Narang et al. | 395/600 |
| 5,542,078 | 7/1996 | Martel et al. | 395/600 |
| 5,551,027 | 8/1996 | Choy et al. | 395/600 |
| 5,659,728 | 8/1997 | Bhargava et al. | 395/602 |
| 5,696,960 | 12/1997 | Bhargava et al. | 395/602 |
| 5,717,924 | 2/1998 | Kawai | 395/613 |
| 5,734,592 | 3/1998 | Cox | 702/179 |
| 5,787,410 | 7/1998 | McMahon | 707/1 |
| 5,806,074 | 9/1998 | Souder et al. | 707/201 |
| 5,832,498 | 11/1998 | Exertier | 707/103 |

OTHER PUBLICATIONS

Rennhackkamp, Martin "Unconventional Referential Constraints", DBMS, v6, n9, p55(6)., Aug. 1993.
Bobrowski, Steve "Enforcing Data Integrity", DBMS, v6, n5, p67 (4), May 1993.
Lunt et al. "The Seaview Security Model", *IEEE Transactions on Software Engineering*, v16, n6, pp. 593–607, 1990.
Benedusi et al. "Maintenance and Prototyping at the Entity–Relationship Level: a Knowledge–Based Support", Software Maintenance, 1990 Conference, pp. 161–169.

*Primary Examiner*—Thomas G. Black
*Assistant Examiner*—Charles L. Rones
*Attorney, Agent, or Firm*—McDermott, Will & Emery

[57] ABSTRACT

The present invention provides a uniqueness-required index and a corresponding non-uniqueness count to support deferred uniqueness constraint enforcement. A uniqueness-required index stores duplicate occurrences of indexed data values that occur during statement or transaction processing. The non-uniqueness count associated with the uniqueness-required index provides a count of the number of indexed data values that occur more than once in the index. Where a non-uniqueness count is not equal to zero, a uniqueness constraint violation remains unresolved. Where an unresolved constraint violation exists at enforcement time, the effects of the processing are removed. A currently non-unique count can be used to represent the number of uniqueness-required indexes that are "currently non-unique". The currently non-unique count can be examined to determine whether there are any unresolved uniqueness constraint violations. Constraints can be enforced at the end of the processing of a statement, a transaction, or within a transaction at a savepoint.

14 Claims, 10 Drawing Sheets

METHOD FOR USING AN INDEX AS A WORKSPACE FOR DEFERRED ENFORCEMENT OF UNIQUENESS CONSTRAINTS

This application is a continuation of application Ser. No. 08/612,562 filed Mar. 8, 1996.

FIELD OF THE INVENTION

This invention relates to the field of deferred enforcement of uniqueness constraints in a computer system.

BACKGROUND OF THE INVENTION

In relational database management systems, information is stored in tables where each piece of data is stored at a particular row and column. In general, all of the information in a given row is associated with a particular object, and all of the information in a given column relates to a particular category of information. For example, each row of a table may correspond to a particular employee, and the various columns of the table may correspond to employee names, employee social security numbers, and employee salaries.

A user retrieves information from and updates a database by submitting queries to a database management system (DBMS). The DBMS processes the queries by retrieving the information and performing the updates specified in the queries. A series of queries or statements submitted to the DBMS for sequential execution is referred to as a transaction.

Operation of a B-tree Index

To facilitate the processing of statements and transactions, the values in one or more columns may be stored in an index maintained separately from the actual database table. Typically, the index is stored in a data structure that facilitates searching, such as the B-tree illustrated in FIG. 1A.

Referring to FIG. 1A, it illustrates a portion of a table 100 and a portion of a B-tree 108 associated with table 100. Table 100 has a plurality of rows 105A–105D, and a plurality of columns 102A–102N. Each table in a DBMS also has an internal column, or pseudocolumn, referred to as rowid. A table's rowid pseudocolumn is not displayed when the table's structure is listed. However, it is retrievable by a query and can be used to uniquely identify a row in the table. Rowid column 103 has rowid entries that correspond to the rows 105A–105D. Column 102N of table 100 stores names.

A B-tree consists of a set of nodes connected in a hierarchical arrangement. A B-tree contains two types of nodes: branch nodes and leaf nodes. Leaf nodes reside at the lowest level of the hierarchy and contain values from the actual column to which the index corresponds. For example, B-tree 108 is an index for column 102N of table 100. Node 134 of B-tree 108 is a leaf node that contains values from column 102N. Along with the values, leaf nodes store the rowid of the rows that contain the values. For example, in addition to the names Issacs, leaf node 134 contains the rowid 4876 which corresponds to the row 105A of table 100 that contains the name Issacs in column 102N.

All the nodes in B-tree 108 that are not leaf nodes are branch nodes. Branch nodes contain data that indicates a range of values. In the illustrated B-Tree 108, nodes 110, 112, 114, 116, 120, 122, 124, 132 and 136 are branch nodes, and therefore correspond to ranges of values. The range of values identified in each branch node is such that all nodes that reside below a given branch node correspond to values that fall within the range of values represented by the branch node. For example, node 114 is a branch node that corresponds to names in the alphabetic range from Franklin to Miner. Consequently, nodes 120, 122, 124, 132, 134, and 136 which all reside below node 114 in the hierarchy, correspond to values that fall within the range of Franklin to Miner. Reference numerals 118, 126, 128, 130, 138 and 140 represent connections to other portions of B-Tree 108 that are not shown.

Searching a B-tree

To search for a value within an indexed column, a DBMS traverses the B-tree associated with the column. The steps for traversing a B-tree are illustrated in FIG. 1B. Referring to FIG. 1B, at step 150 the highest node in the B-tree hierarchy is established as the current node. For the purposes of illustration, it shall be assumed that a search is being performed for the name "Iverson" in column 102N. Therefore, the highest node of the B-Tree that corresponds to column 102N (node 110) shall be established as the current node at step 150. The value for which a search is being performed shall be referred to hereafter as the "target value". In the present example, "Iverson" is the target value.

At step 152, it is determined whether the target value falls within the range associated with the highest node. In the illustrated example, the target name "Iverson" falls within the range "Abbey" to "Zachary" associated with the highest node 110. Therefore control passes to step 158. If the target value did not fall within the range associated with the highest node, then the target value does not reside in the column associated with the B-Tree 108 and control would pass to step 154.

At step 158, the nodes that reside directly below the current node are inspected to determine the next current node. The next current node is the node below the current node that represents the range in which the target value resides. In the present example, nodes 112, 114 and 116 reside below the current node 110. Node 114 corresponds to the range "Franklin" to "Miner", in which the target name "Iverson" resides. Therefore, node 114 is established as the new current node.

At step 160, it is determined whether the current node is a leaf node. In the present example, node 114 is not a leaf node so control passes back to step 158.

At step 158, nodes 120, 122, and 124 which reside directly below the current node 114 are inspected. Node 122 is selected as the next current node because the target name "Iverson" resides within the range "Hamilton" to "Jones" associated with node 122. At step 160 it is determined that the current node 122 is not a leaf node so control passes back to step 158. At step 158, nodes 132, 134, and 136 are inspected, and node 134 is selected as the next current node because the target name "Iverson" falls within the range of names contained within node 134.

At step 160, it is determined that the current node 134 is a leaf node and control passes to step 162. At step 162, it is determined whether the current leaf node 134 contains the target value. In the present example, the name "Iverson" is contained in leaf node 134, so control passes to step 156. If the current leaf node does not contain the target value, control passes to step 154 where a signal indicating that the value was not found is generated.

At step 156, a signal is generated indicating that the target value was found within the index, and the rowid associated with the value is also returned. In the illustrated example, the rowid associated with the name "Iverson" is 10005.

Uniqueness Constraints

It is sometimes desirable to put limitations on the values that are stored in a column. For example, it may be desirable to prohibit duplicate values in a column that represents the social security numbers for employees. A prohibition against duplicate values within a column is referred to as a uniqueness constraint. Stated generally, a uniqueness constraint prohibits two or more rows of a table from having the same value in a column or a group of columns. When two rows of a table have the same value in a column or a group of columns, a "uniqueness constraint violation" is said to have occurred.

While a database is being updated, there may be instances where a column with a uniqueness constraint temporarily includes two or more identical data values. Such temporary uniqueness constraint violations are permitted in some systems during the processing of a statement or transaction. The uniqueness constraint is enforced only after the processing of the statement or transaction has been completed.

Deferred Enforcement of Uniqueness Constraints

The American National Standards Institute (ANSI) and International Standards Organization (ISO) standards for the Structured Query Language (SQL) require that a DBMS that implements the standard provide the ability to defer enforcement of uniqueness constraints to the end of an SQL statement, or, alternatively, after a series of SQL statements comprising a transaction. When a DBMS defers enforcement of uniqueness constraints to the end of an SQL statement, it is referred to as statement level enforcement. When a DBMS defers enforcement of uniqueness constraints to the end of a transaction, it is referred to as transaction level enforcement.

FIG. 2 illustrates a mechanism for deferring uniqueness constraints according to the prior art. Referring to FIG. 2, in addition to an index 208, a workspace 204 is associated with a column 202N of table 200. A workspace is a set of values, typically stored in dynamic memory, but optionally stored on disk. Values can be inserted, updated, and deleted from a workspace. Workspaces may be designed to support rollback. If range scans of a workspace are required, workspaces can be implemented with a binary tree. Otherwise, workspaces can be implemented with a hash table.

Workspace 240 stores values that are temporarily duplicated in column 202N. In the illustrated example, the name "Issacs" is contained both in rows 205A and 205F of column 202N. Similarly, the name "Jacobs" is contained in both rows 205C and 205E of column 202N.

Leaf node 234 of index 208 contains a reference to one of the rows for each of the duplicate values, while workspace 240 contains references to all of the other rows that contain duplicate values. For example, node 234 indicates that the row with rowid 4876 contains the name "Issacs", while workspace 240 indicates that the row with rowid 83457 contains the name "Issacs". If additional rows are added or updated to contain the name "Issacs" in column 202N, then workspace 240 would be updated to indicate all of the additional rows associated with the duplicated names "Issacs". Index 208 would remain unchanged.

By providing a workspace for temporarily storing duplicate values, enforcement of uniqueness constraints may be deferred. Specifically, processing may proceed as normal without regards to whether a column has a uniqueness constraint until the time at which the uniqueness constraint is to be enforced ("enforcement time"). Specifically, if an operation results in a new value in column 202N, index 208 is searched (using the search process described above) to identify the leaf node associated with the range into which new value falls. If the leaf node already contains an entry that matches the new value (because the new value resides in another row of column 202N), then the new value and its corresponding row are stored in workspace 240.

When a value is deleted from column 202N, workspace 240 is searched to determine whether the workspace 240 has any entry that matches the target value, and index 208 is searched to find the entry in index 208 that corresponds to the target value. If the workspace does not have an entry that matches the target value, then the entry in the index 208 that matches the target value is deleted. If the workspace contains an entry that matches both the target value and the rowid of the value to be deleted, then the entry in the workspace is deleted. If the workspace contains an entry that matches the target value but not the rowid of the value to be deleted, then the entry in the workspace is deleted and the rowid of the entry in the index 208 that corresponds to the target value is updated to the rowid of the entry that was deleted from the workspace 240.

For example, assume that row 205A is to be deleted from table 200. Consequently, all references to the name "Issacs" that are associated with rowid 4876 must be deleted. Workspace 204 is searched to determine whether workspace 240 has any entry for "Issacs", and index 208 is searched to identify the entry in leaf node 234 that contains an entry for the name "Issacs". In the illustrated example, workspace 204 has an entry for the name "Issacs", but the rowid associated with the entry does not match the rowid of the row that is to be deleted. Therefore, the entry in workspace 204 for the name "Issacs" is deleted, and the rowid of the entry for "Issacs" in leaf node 234 is changed from its current value (4876) to the rowid of the entry that was deleted from workspace 204 (i.e. 83457).

At enforcement time, the workspace associated with a column with a uniqueness constraint is inspected to determine whether any uniqueness constraint violations have not been resolved. If workspace 240 contains any entries at enforcement time, then the changes made by the statement or transaction that caused the uniqueness constraint violation are not committed to the database. Under these conditions, appropriate recovery operations are performed, such as rolling back the statement or transaction and attempting to perform the statement or transaction again.

One disadvantage of using workspaces to defer the enforcement of uniqueness constraints is that to accurately process queries that contain "Select" statements, all entries (including duplicates) must be considered. If entries are distributed between indexes and workspaces, some mechanism would have to be provided to process such queries as if the entries were combined in a single depository. The complexity of such a mechanism is significantly increased if the database system is to support certain isolation levels, such as a "read-consistent" mode.

Based on the foregoing, it is clearly desirable to provide a method and apparatus that allows enforcement of uniqueness constraints to be deferred without distributing the entries associated with a key between two or more depositories.

SUMMARY OF THE INVENTION

The present invention provides a uniqueness-required index and a corresponding non-uniqueness count to support deferred uniqueness constraint enforcement. A uniqueness-required index stores duplicate occurrences of indexed data values that occur during statement or transaction processing. According to one embodiment, the non-uniqueness count associated with the uniqueness-required index provides a count of the number of duplicate entries in the index. In an alternate embodiment, the non-uniqueness count associated with the uniqueness-required index provides a count of the number of indexed data values that occur more than once in the index. In either case, where a non-uniqueness count is not equal to zero, a uniqueness constraint violation remains unresolved. Where an unresolved constraint violation exists at enforcement time, the effects of the processing are removed.

According to one embodiment, the non-uniqueness counts are maintained in a list. When a uniqueness-required index becomes non-unique, a uniqueness count is created for the index and added to the list. When the non-uniqueness count of any uniqueness-required index becomes zero, the non-uniqueness count is removed from the list. An empty list of non-uniqueness counts indicates that no unresolved uniqueness constraint violations remain.

According to an alternative embodiment, a currently non-unique count can be used to represent the number of uniqueness-required indexes that are "currently non-unique". The currently non-unique count can be examined to determine whether there are any unresolved uniqueness constraint violations. Constraints can be enforced at the end of the processing of a statement, a transaction, or within a transaction at a savepoint.

The present invention includes techniques for preventing concurrently executing transactions from concurrently changing different index entries associated with the same index value by requiring transactions to obtain exclusive ownership of an invariant resource associated with the index value. According to one embodiment, the invariant resource is the block containing the first currently-existing index entry associated with the index value. If there is currently no existing index entry associated with the index value, the transaction determines the slot into which a particular fake index entry would be inserted. The slot into which the fake index entry would be inserted is used as the invariant resource. Ownership of the slot may be obtained by actually inserting the fake entry into the slot, or by obtaining a write lock on the block that contains the slot.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
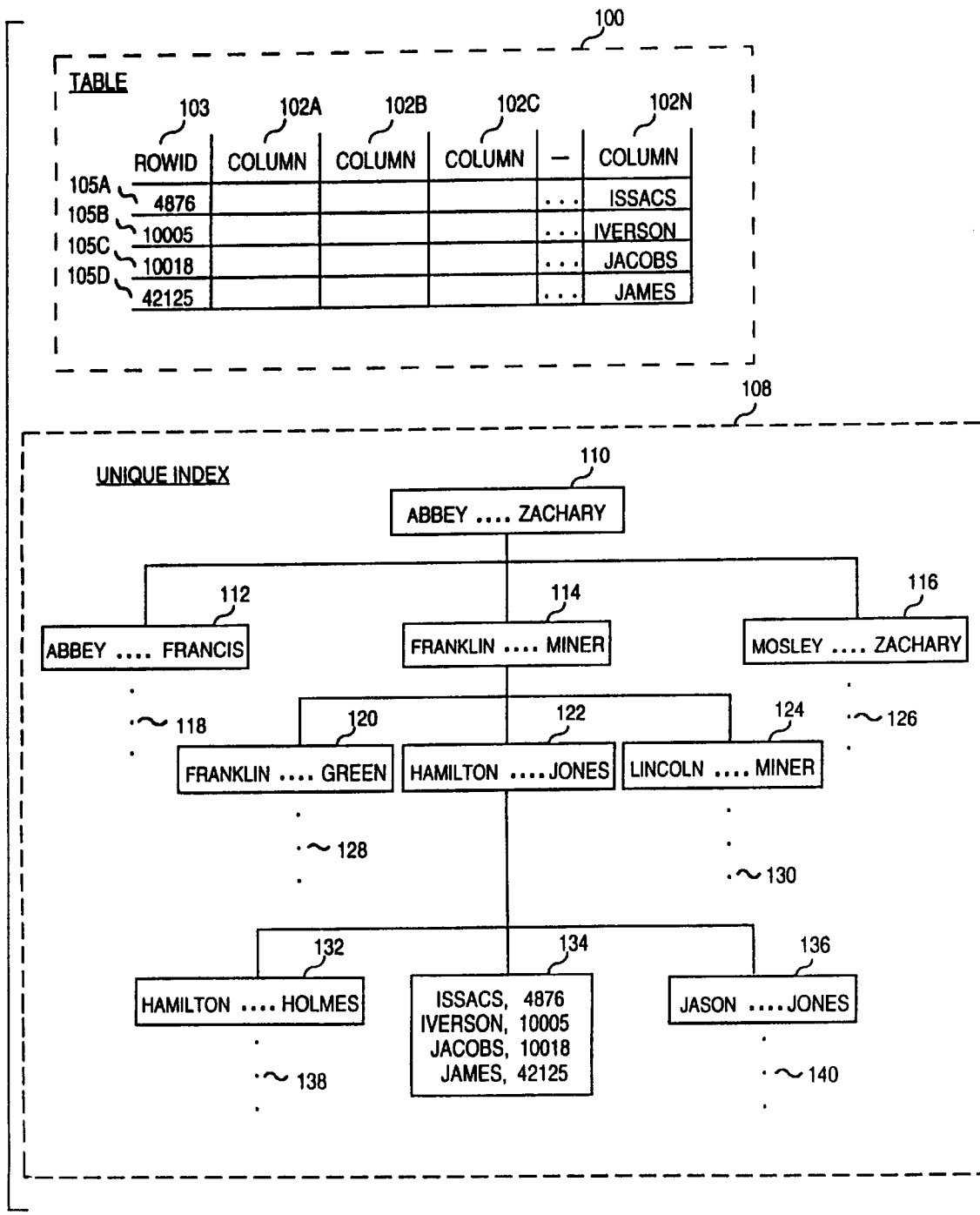
FIG. 1A illustrates a table and a B-tree index that corresponds to a column of the table according to the prior art.
Figure 1B:
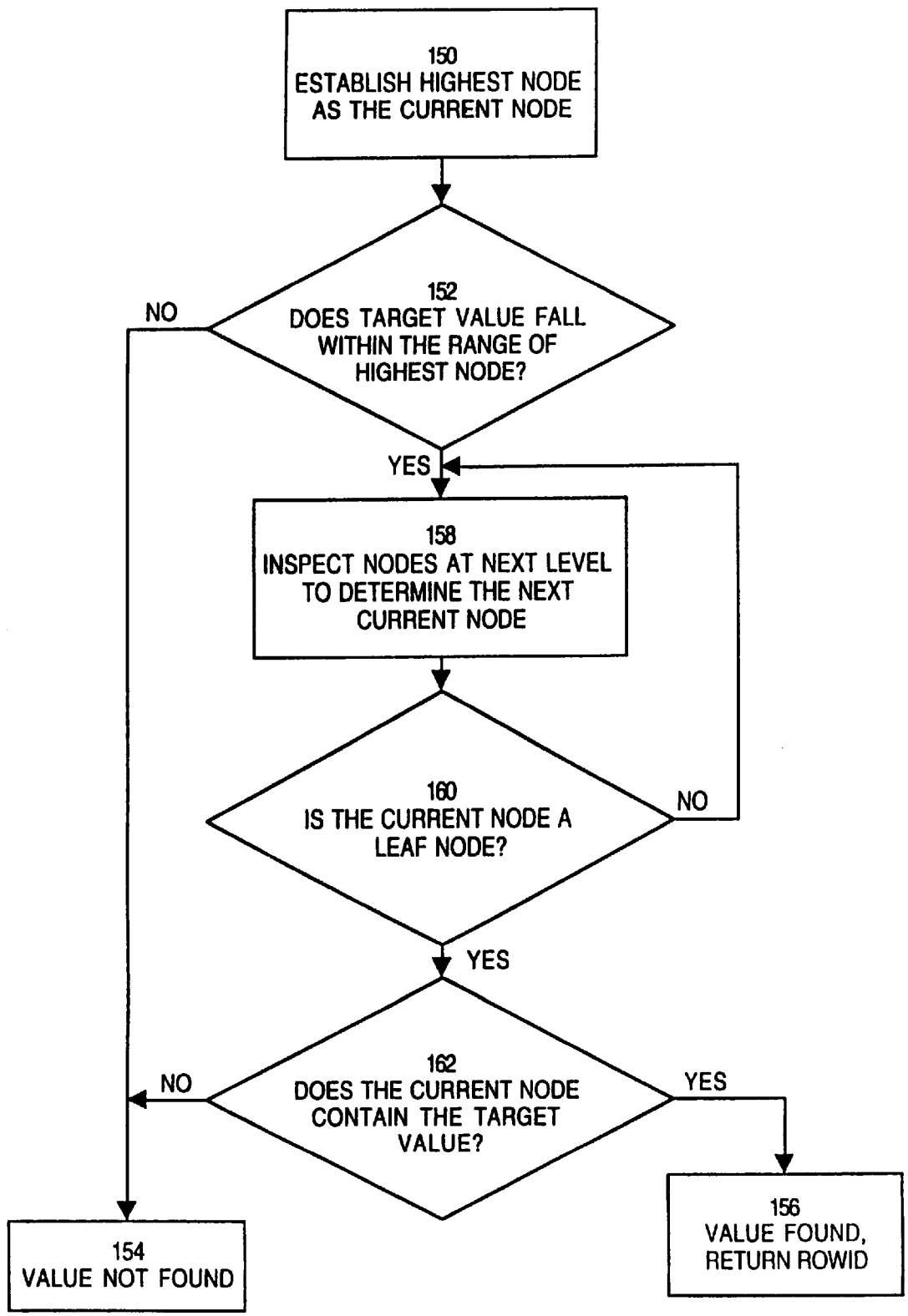
FIG. 1B is a flow chart illustrating the steps for searching for a value in a B-tree.
Figure 2:
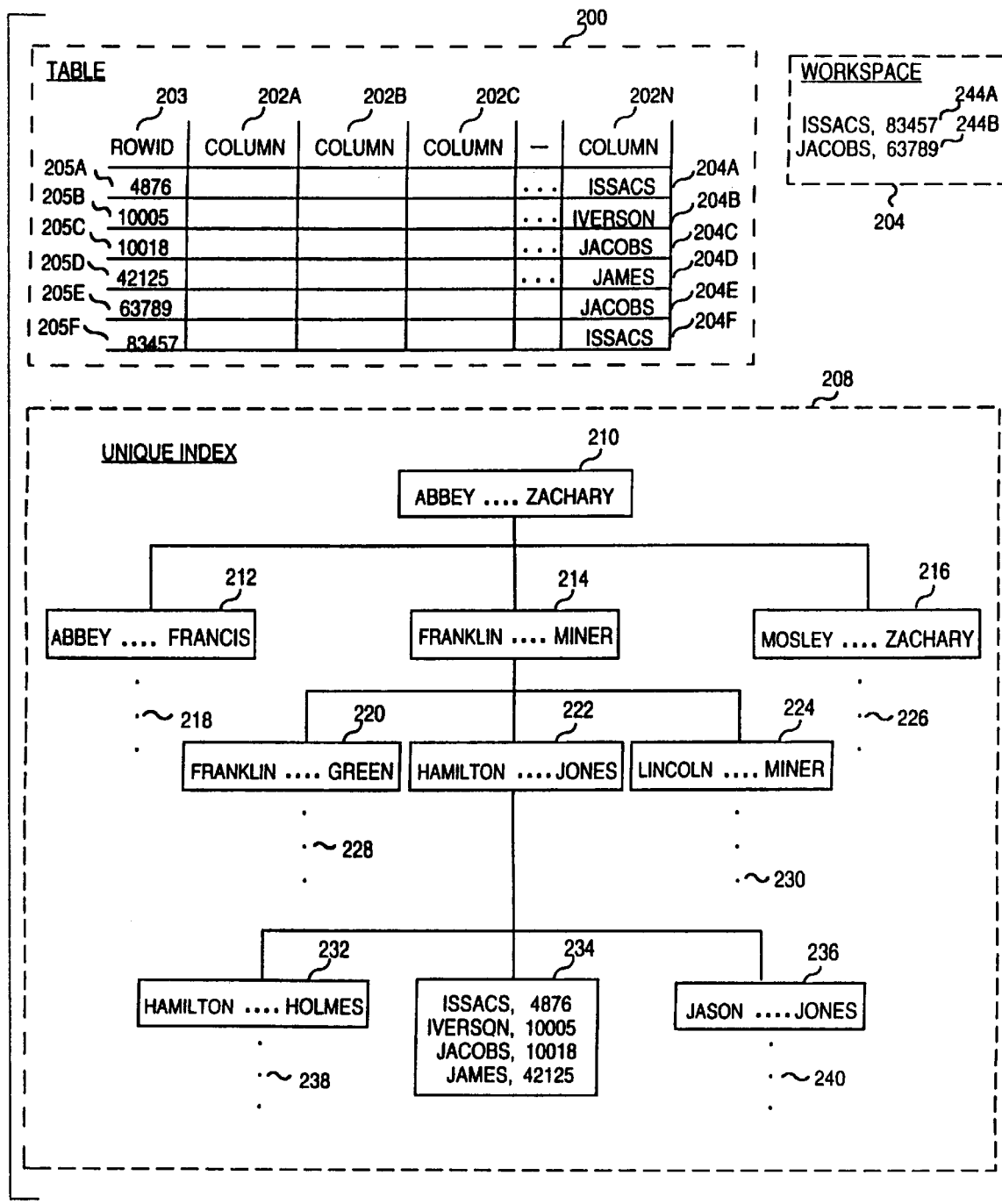
FIG. 2 illustrates a workspace that is employed along with an index to defer the enforcement of uniqueness constraints according to the prior art.

The present invention provides a solution to the disadvantages of prior art uniqueness constraint enforcement systems. Instead of using a unique index with a separate workspace to store duplicate values, the present invention uses an index that is capable of containing duplicate occurrences of a value (a "uniqueness-required index"). When there is more than one occurrence of a value, the duplicate occurrence is stored in the uniqueness-required index itself, eliminating the need for a separate workspace. The number of uniqueness constraint violations in each uniqueness-required index are tracked by using a "non-uniqueness" count.

Because duplicate values are stored in the index rather than in a separate workspace, all indexed data values are accessible by scanning the uniqueness-required index. Further, uniqueness or non-uniqueness is determinable by simply examining a non-uniqueness count. Further, reading a uniqueness-required index can be performed without accessing any workspace to locate duplicate index entries.

The present invention is discussed with reference to the enforcement of uniqueness constraints on a column or columns of a table in a DBMS. However, the present invention can be used to enforce uniqueness in other contexts. For example, the present invention can be used to manage queues, or to schedule transactions with a database system. Applications that allocate resources can use the present invention to ensure that multiple allocations or assignments of the same resource are not made. Examples of such applications include airline seat reservation and hotel room assignments.

Non-Uniqueness Count

According to one embodiment, there is one non-uniqueness count for each uniqueness-required index for each session. In the preferred embodiment, the non-uniqueness count is maintained in dynamic memory. The storage for the non-uniqueness count is allocated when the first duplicate entry is added to the uniqueness-required index. When storage for a count has not been allocated, the count is presumed to be zero. The storage for the non-uniqueness count is de-allocated when the count reaches zero, or alternatively, at the end of the transaction.

According to another embodiment, the storage for the non-uniqueness count remains allocated for the duration of a session (i.e., a connection between the application and the database system). In session level allocation, storage for a non-uniqueness count is allocated the first time a transaction in the session references a uniqueness-required index. The storage for the non-uniqueness count is de-allocated at the end of the session.

Constraint violations are tracked using the non-uniqueness count. According to one embodiment of the invention, constraint violations are counted on a "per data value" basis. In this embodiment, the non-uniqueness count represents the number of data values within the index that have duplicates. The non-uniqueness count is incremented by one for the first duplicate instance of a data value. For subsequent duplicates for the same data value, the non-uniqueness count is not incremented. That is, whether there are 2, 3, or 20 instances of the last name of "Jacobs", there is only one uniqueness constraint violation for that data value "Jacobs".

When a data value is created or added during a transaction or statement, a check is made to see if the new data value has created a constraint violation. A constraint violation occurs when the new data value is inserted in a column having a uniqueness constraint and the value already exists in column. For example, when the last name of "Jacobs" is inserted in a uniquely constrained column of a table, but that last name already exists in another row in the constrained column, a constraint violation occurs.

At the beginning of a statement or transaction, the non-uniqueness count associated with the index is zero. A zero value indicates that there are no uniqueness constraint violations in the column that corresponds to the index. When a new value is created (by updating an existing entry or adding a new value) in the column, an entry for the new value must be placed in the index. The DBMS searches the index to find the proper location to insert the new value. If an identical data value already exists at that location in the index, a uniqueness constraint violation exists. The present invention stores the extra value at the location by adding a new entry that contains both a data value and a rowid pointer, or by adding an additional rowid pointer to the existing entry.

When a data value is deleted, the system checks to see if an existing constraint violation has been resolved. A delete resolves a constraint violation when it removes the only duplicate of a target value. When that occurs, the non-uniqueness count is decremented by one. One way to test whether a constraint violation has been resolved by a delete operation is to count the number of entries at the index location that have the same value as the deleted entry. If there is a single entry with the target value remaining, the only duplicate has been deleted and a resolution of a violation has occurred. When there are no remaining entries with the target value at the index location, there was no constraint violation to begin with, so no resolution has been effected. The non-uniqueness count is not decremented. When there are two or more remaining entries with the target value at the index location, there is still a constraint violation. The non-uniqueness count is not decremented.

Enforcement Time

Enforcement of uniqueness constraints are deferred to the appropriate enforcement time. In a DBMS, for example, enforcement may be deferred until processing is completed for either a statement or a transaction. If constraint enforcement is deferred until the end of the statement (i.e., statement level enforcement), the non-uniqueness counts associated with the uniqueness-required indexes referenced during the processing of the statement are examined during the final phase of execution of the statement processing. If any of the uniqueness-required indexes are "currently non-unique", the effects of the statement are reversed (i.e., not made permanent in the database). Further, an error indication can be raised, or logged.

Similarly, if constraint enforcement is deferred until the end of a transaction (i.e., transaction level enforcement), the non-uniqueness counts associated with the uniqueness-required indexes referenced during the processing of the transaction are examined as an initial part of transaction commit processing. If any of the uniqueness-required indexes are "currently non-unique", the commit is not performed. Further, an error indication is raised, or logged.

Where an unresolved uniqueness constraint exists at enforcement time, the effects of the statement or transaction processing are not made to the database. In the case of statement level enforcement, the existence of an unresolved constraint after a statement is processed results in the removal of the database modifications made as a result of the statement.

In the case of transaction level enforcement, deferred constraint enforcement is done prior to committal of the transaction's database modifications. Where an unresolved constraint violation exists at enforcement time, the transaction's database modifications are not committed to the database. Where no unresolved constraint violations exist at enforcement time, the transaction's modifications are committed to the database.

Roll-Back With Non-uniqueness Counts

Roll-back operations are performed based on undo information that is stored during the execution of a transaction. Specifically, when an operation is performed based on a statement in a statement or transaction, the DBMS stores undo information which indicates how to reverse the effects of the operation. Such undo information may include, for example, the inverse operation of the operation that was performed. A transaction may therefore be rolled-back simply by executing, in reverse chronological order, the inverse operations represented in the undo information for each of the statements that was executed.

According to one embodiment of the invention, when the execution of a statement changes the non-uniqueness count of a uniqueness-required index, an inverse operation that, upon execution, will reverse the change made to the non-uniqueness count is stored as part of the undo information. Therefore, the non-uniqueness count will be accurate after a roll-back operation. Assume, for example, that statements A, B, C and D are executed, and that each of the statements affected the non-uniqueness count of a uniqueness-required index. If operations B, C, D are rolled back, the non-uniqueness count should reflect only those changes made by statement A.

Typically, the undo mechanism used to roll back an index is not aware of the location within dynamic memory of the non-uniqueness count of the index. Therefore, the undo information that contains the inverse of the operations that alter the non-uniqueness count is maintained separate from the undo information used to roll back the index. When the index is rolled back, a separate undo mechanism that is aware of the location of the non-uniqueness count executes the non-uniqueness count roll-back operations to ensure that the accuracy of the non-uniqueness count is maintained during index roll-back operations.

Savepoints

An alternative to statement level enforcement and transaction level enforcement is savepoint level enforcement. In savepoint level enforcement, intermediate markers, referred to as savepoints, are used to specify locations within transactions. If an index is not unique when a uniqueness constraint is enforced. then the transaction is rolled back to the last savepoint in the transaction, rather than all the way to the beginning of the transaction.

Specifically, the non-uniqueness counts are inspected at enforcement time. If an unresolved constraint violation exists, changes made since the most recent savepoint are rolled back. The number of changes that are rolled back depends on when the location of the last savepoint relative to the current position within the transaction at the enforcement time. After the roll back is complete, another attempt can be made to process the statements that were rolled back.

If an unresolved constraint violation did not exist at enforcement time, then processing proceeds as normal. Specifically, each non-uniqueness count is incremented when an indexed data value is first duplicated. Each non-uniqueness count is decremented when a duplicated indexed value becomes unique (i.e., when duplicated occurrences are eliminated).

If an unresolved constraint violation exists at the next enforcement time, the changes made since the most recently passed savepoint will be rolled back. As explained above, the inverse of the operations that changed the non-uniqueness count after the savepoint will be executed during roll-back. Consequently, the non-uniqueness count will be the same after roll-back to the savepoint as they were when the savepoint was passed during execution of the transaction.

According to one embodiment of the invention, a list is generated for each uniqueness-required index for each session. Every time the counter of an index changes, an entry is added to the list associated with the index. The entry includes the new value of the non-uniqueness count of the index and a savepoint indicator. When a transaction is rolled back to a particular savepoint, entries are removed from the tail of the list until an entry is encountered that has a savepoint indicator that identifies the savepoint to which the transaction is being rolled-back. The entry that contains the corresponding savepoint-indicator will indicate the uniqueness count value that the corresponding index should have after the roll-back is performed.

Multiple Constrained Columns

A key can consist of several columns. A statement or transaction can reference keys in several tables. Some or all of these keys can be uniquely constrained. A uniqueness-required index and non-uniqueness count is used for each constrained key to enforce the key's uniqueness constraint. Enforcement of a constraint is performed by examining the non-uniqueness counts associated with the uniqueness-required indexes referenced during the statement or transaction processing. An unresolved uniqueness constraint exists where any non-uniqueness count has a value that is greater than zero. If there are no unresolved uniqueness constraints at enforcement time, the effects of the statement or transaction processed are made permanent in the database.

As an alternative to examining each non-uniqueness count to detect the existence of an unresolved uniqueness constraint, a "currently non-unique count" can be maintained in addition to the non-uniqueness count(s) that correspond to the individual uniqueness-required index(es). A currently non-unique count represents the number of uniqueness-required indexes that are "currently non-unique". When a uniqueness-required index becomes "currently non-unique" (i.e., its non-uniqueness count becomes non-zero), the currently non-unique count is incremented by one. When a uniqueness-required index becomes "currently unique" (i.e., its non-uniqueness count becomes zero), the currently non-unique count is decremented by one. Where the currently non-unique count is greater than zero, there are unresolved uniqueness constraints. Where the currently non-unique count is equal to zero, there are no unresolved uniqueness constraints. Therefore, instead of examining each non-uniqueness count to determine whether there are any unresolved uniqueness constraints, it is only necessary to examine the currently non-unique count to determine whether there are any unresolved constraints.

According to an alternate embodiment, the non-uniqueness counts are maintained in a list. When a uniqueness-required index becomes non-unique, a uniqueness count is created for the index and added to the list. When the non-uniqueness count of any uniqueness-required index becomes zero, the count associated with the index is removed from the list. An empty list of non-uniqueness counts indicates that no unresolved uniqueness constraint violations remain.

Exemplary Insert, Delete and Update Operations

Figure 3A:
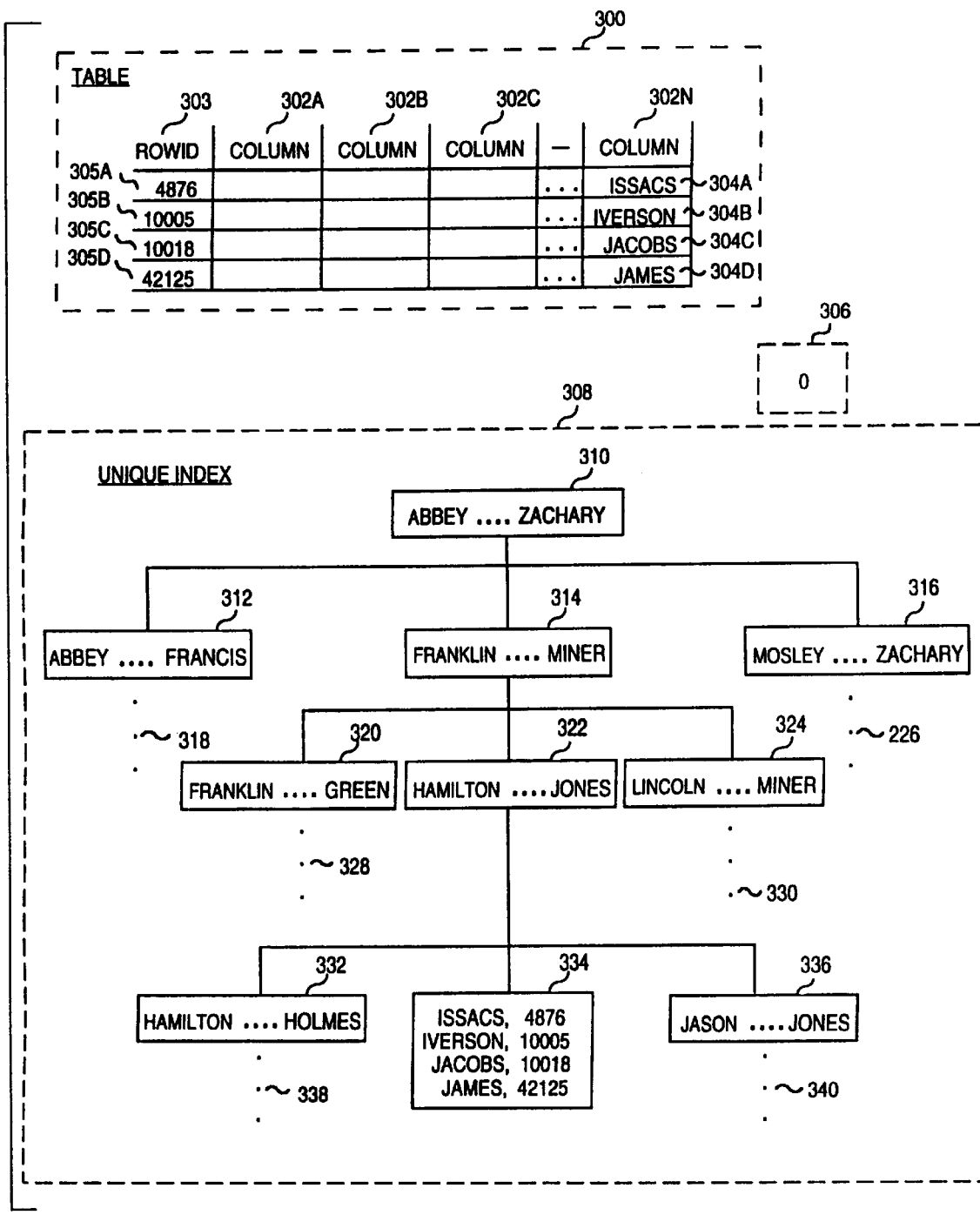
FIG. 3A illustrates a uniqueness-required index in which no values are duplicated.
Figure 3B:
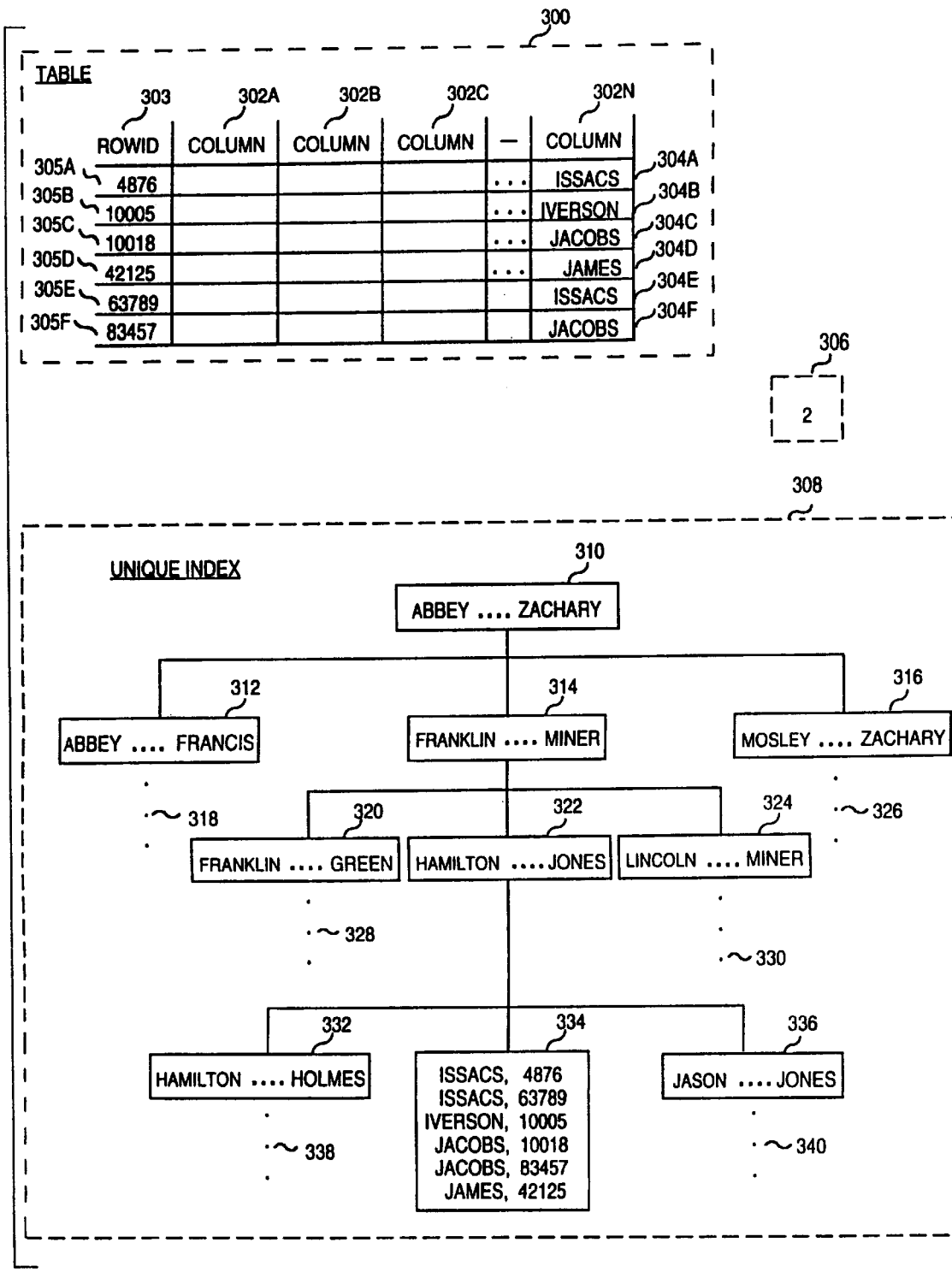
FIG. 3B illustrates the uniqueness-required index of FIG. 3A in which two values are duplicated.

Examples of insert, delete, and update operations using a uniqueness-required index are provided with reference to FIGS. 3A–3B. Referring to FIG. 3A, table 300 contains column 302N that has a uniqueness constraint. Uniqueness-required index 308 is a B-tree structured index created on column 302N. Other index structures that store entries in sorted order can also be used with the present invention.

Uniqueness-required index 308 has branch nodes 310, 312, 314, 316, 320, 322, 324, 332, and 336. The ordering of the reference numerals does not necessarily reflect the order of allocation of the nodes. Entries in leaf node 334 of index 308 has "value : rowid" entries, each of which includes an indexed data value from column 302N and a rowid pointer to the row in table 300 that contains the corresponding indexed data value. A non-uniqueness count 306 associated with uniqueness-required index 308 currently contains "0" to indicate that uniqueness-required index 308 is "currently unique". That is, that there are no duplicates of any indexed data values in uniqueness-required index 308, and, therefore, no duplicates of the indexed data values in column 302N of table 300.

Referring to FIG. 3B, insert operations have been performed in which occurrences of "Issacs" and "Jacobs" (column entries 304E and 304F, respectively) have been inserted into column 302N of table 300. These new values are duplicate occurrences of last names that already exist in column 302N of table 300 (column entries 304A and 304C). In addition to inserting the duplicate occurrences in table 300 (column entries 304E and 304F), corresponding entries must be inserted in uniqueness-required index 308. The uniqueness-required index 308 is searched to determine the location in the index 308 to insert entries for the new indexed data value occurrence. By searching the index 308 to insert the index entries associated with column entries 304E and 304F, the existence of duplicate values in the uniqueness-required index 308 can be ascertained. Thus, once the location for inserting a new index entry in the uniqueness-required index 308 is found, it is further possible to determine whether an index entry with the same value already exists. Even when the new entry has the same value as an existing entry, the duplicate value is stored in the uniqueness-required index 308. There is no need to use a separate area such as a workspace to store duplicate occurrences of indexed values. When the insertion of the new occurrence of the indexed data value creates the first duplicate occurrence of a data value in the uniqueness-required index, non-uniqueness counter 306 is incremented.

To insert the indexed data value "Issacs" in the uniqueness-required index, a location for inserting the new entry in the uniqueness-required index is found by searching uniqueness-required index 308. In the present example, the insertion location is in leaf node 334. Once the insertion location is found, leaf node 334 is updated to reflect the two occurrences of the value "Jacobs" in table 300. Leaf node 334 now contains entries "Issacs, 4876" and "Issacs, 63789" in table 300. The non-uniqueness count 306 must be updated to indicate that an additional indexed data value (in this case the indexed data value "Issacs") now occurs more than once.

To insert the indexed data value "Jacobs", a location for inserting the new entry in the uniqueness-required index is found by searching uniqueness-required index 308. Once the insertion location is found, leaf node 334 is updated to include an entry for the duplicate occurrence of "Jacobs" in table 300. Leaf node 334 now contains two entries for "Jacobs". Each of the two entries has a rowid that points to a record containing the last name value of "Jacobs". Because the uniqueness-required index now contains a duplicate occurrence of the last name value of "Jacobs", the non-uniqueness counter 306 is incremented. Non-uniqueness count 306 is now equal to "2" to reflect the fact that two indexed data values (i.e., "Issacs" and "Jacobs") are duplicated in the uniqueness-required index. If additional entries for the name "Jacobs" are added to the index, the non-uniqueness counter 305 is not incremented, since only the insertion of the first duplicate causes the non-uniqueness count 306 to increment.

Figure 3C:
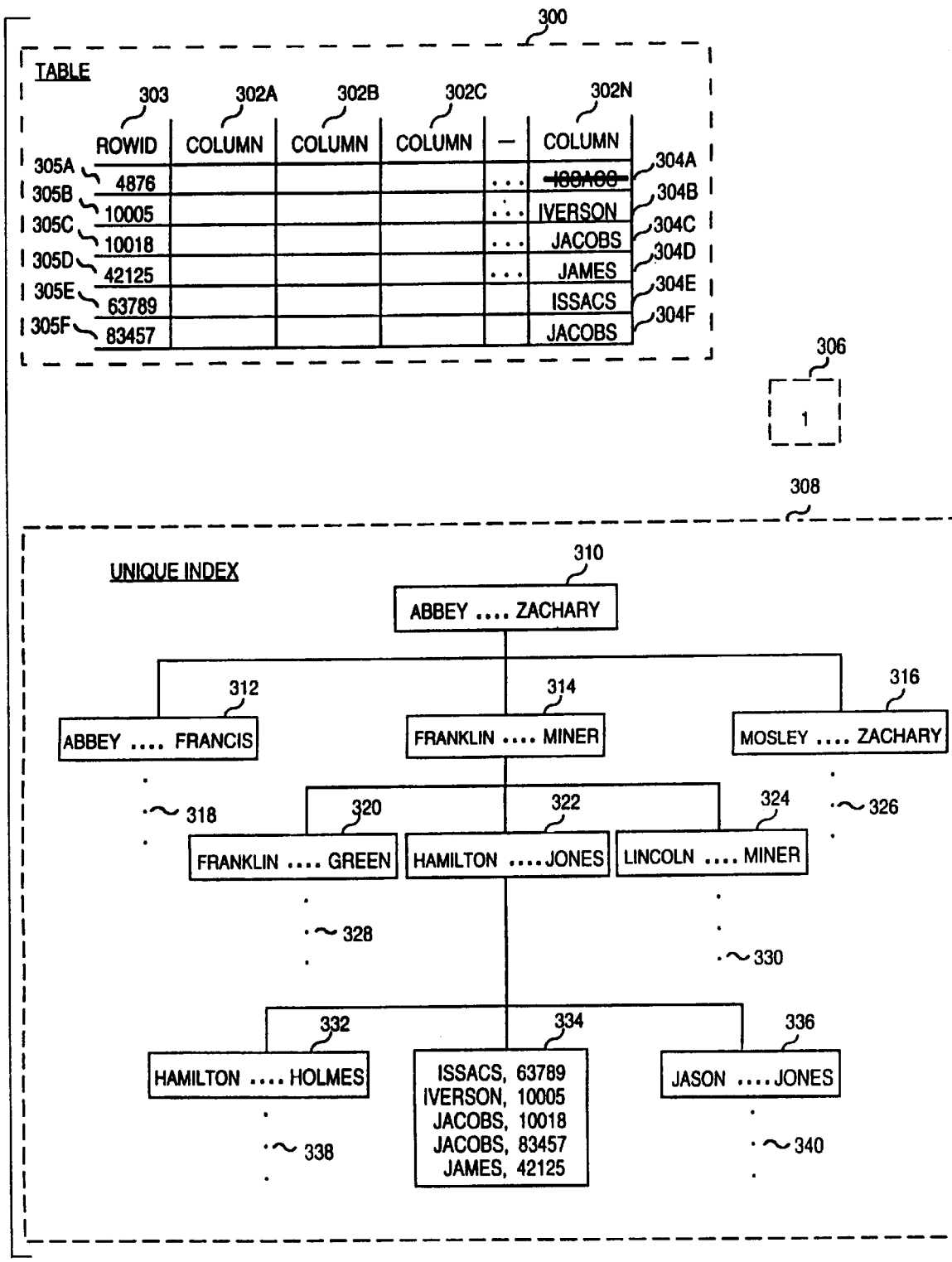
FIG. 3C illustrates the uniqueness-required index of FIG. 3B in which a row containing a duplicated value is deleted.

Referring to FIG. 3C, it illustrates a delete operation that deletes the row 305A containing column entry 304A (i.e., "Issacs"). The delete operation removes the index entry, which contains the indexed data value "Issacs", that corresponds to the row to be deleted. To process the delete operation, the uniqueness-required index 308 is searched to locate the leaf node entry that contains the indexed data value "Issacs" (i.e., entry "Issacs, 4876" in leaf node 334 of FIG. 3B). There is no need to access a separate workspace.

In FIG. 3B, leaf node 334 contains two entries for the "Issacs" last name. Each entry points to one of the two records that contain the "Issacs" indexed data value. The leaf node entry with a pointer that points to the row to be deleted (rowid "4876" for row 305A) is removed from leaf node 334 of uniqueness-required index 308.

Referring to FIG. 3C, the resulting leaf node 334 includes only one entry for the "Issacs" indexed data value in table 300. Because a uniqueness-required index can store duplicates, there is no need to access a separate workspace to move a duplicate occurrence of indexed data value "Issacs" into the uniqueness-required index. Since there is no longer a duplicate occurrence of "Issacs" in uniqueness-required index 308, the non-uniqueness count 306 is reduced by one. After decrementing non-uniqueness count 306, non-uniqueness count 306 indicates that only one indexed data value is duplicated. As described next, an update operation is performed that removes this duplicated value.

Figure 3D:
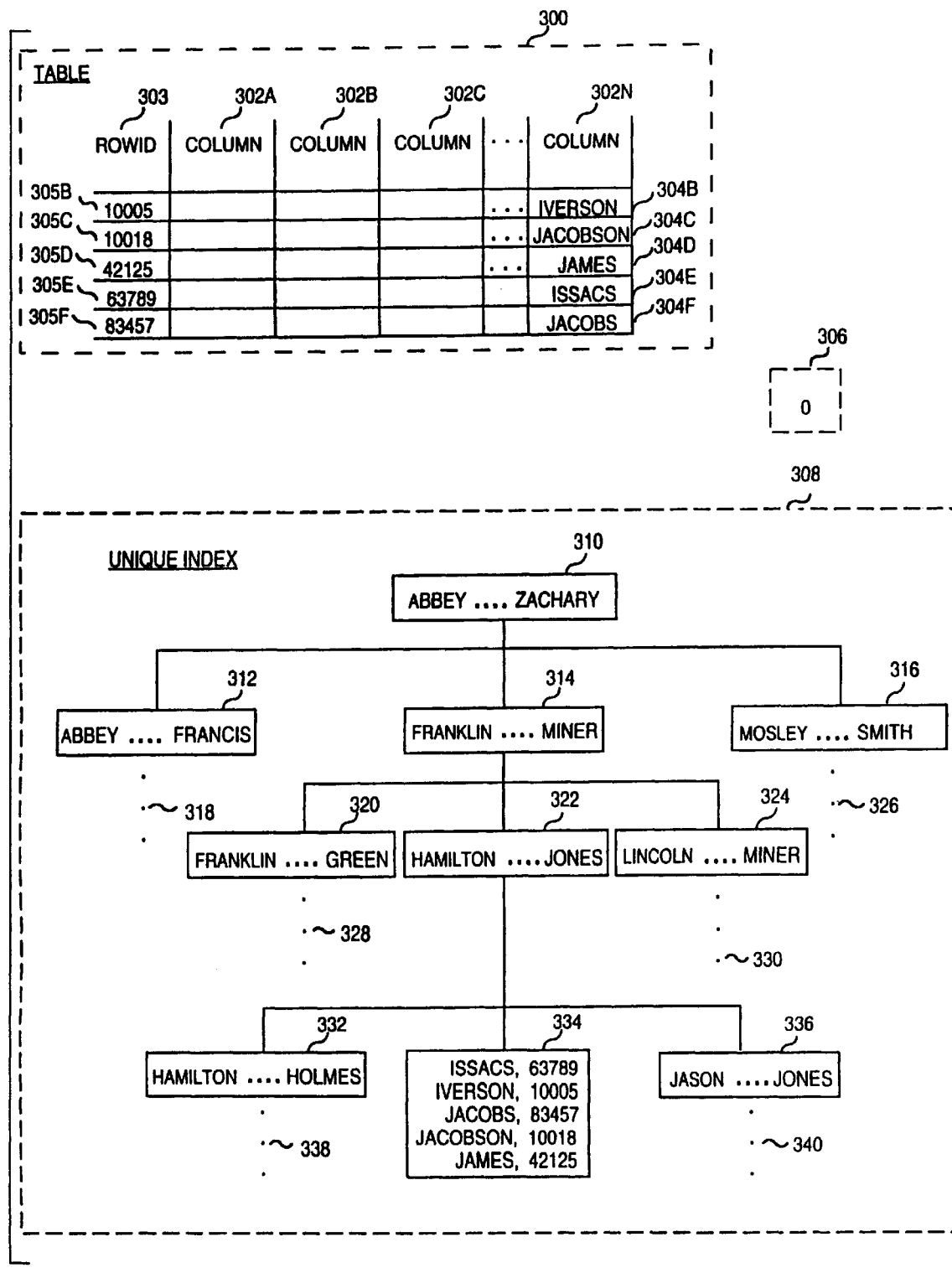
FIG. 3D illustrates the uniqueness-required index of FIG. 3C in which a duplicated value has been updated to a different value.

Referring to FIG. 3D, an update operation changes the value in column entry 304C from "Jacobs" to "Jacobson". To process the update operation, the uniqueness-required index 308 is searched to locate the index entry associated with the column value 304C ("Jacobs, 10018"). Entry "Jacobs, 10018" of leaf node 334 of FIG. 3B corresponds to the column entry 304C in table 300 that is being updated.

The entry is changed from "Jacobs, 10018" to "Jacobson, 10018" in leaf node 334 of FIG. 3D to reflect the update made to column entry 304C. Referring to FIG. 3D, leaf node 334 reflects the updated leaf node entry ("Jacobson, 10018") and the fact that there is only one occurrence of indexed data value "Jacobs" in uniqueness-required index 308 ("Jacobs, 83457"). Since there is no longer a duplicate for the last name of "Jacobs" in uniqueness-required index 308, the non-uniqueness count 306 is reduced by one.

After the update operation, the non-uniqueness count 306 is equal to zero. A zero value for the non-uniqueness count 306 indicates that no duplicates exist in uniqueness-required index 308. Thus, the uniqueness-required index is "currently unique". Therefore, if the update operation is the last operation to be processed, all interim constraint violations are resolved by the end of the processing. Thus, the changes to table 300 and uniqueness-required index 308 made during the processing of the insert, delete, and update operations described can be made permanent in the database.

If non-uniqueness count 306 was not equal to zero after the last operation, the effects made as a result of the operations are not permanently made to the database. For statement level enforcement, the effects of the statement are removed from database. Where transaction level enforcement is being used, the transaction's effects are not committed to the database. Instead, the transaction is rolled back, or alternatively, the commit statement fails.

As an alternative to examining the non-uniqueness count of each uniqueness-required index after processing is completed, a single count can be maintained in addition to the non-uniqueness counts. This count, a "currently non-unique count," can be examined to determine whether there are any unresolved uniqueness constraints. The currently non-unique count can be retained as part of the transaction state or session state in memory, for example. The currently non-unique count identifies the number of referenced uniqueness-required indexes that are "currently non-unique". If a uniqueness-required index becomes "currently non-unique" during processing, the currently non-unique count is incremented. At the end of processing, it is only necessary to examine the currently non-unique count to determine whether any unresolved constraint violation remains. Where the currently non-unique count is zero, there are no unresolved constraint violations. Where the currently non-unique count is non-zero, there are unresolved constraint violations.

By maintaining one count, a currently non-unique count, that is examined during enforcement of the constraints, processing time can be reduced. The reduction in processing time results from the fact that only one count is examined to determine whether any unresolved uniqueness violation exist. This eliminates the need to examine each non-uniqueness count until a non-zero value is found, or all non-uniqueness counts have been examined. Further, the single count can be maintained when the non-uniqueness count is updated for any uniqueness-required index.

Concurrency Problems

When two or more transactions are processed concurrently, they may interact in undesirable ways. To prevent such interactions, a typical DBMS allows only one transaction to access certain resources at any given time. For example, the actual data within a database is stored in lockable containers referred to as blocks. The granularity of blocks may vary from implementation to implementation. For example, some databases may allow individual data elements to be locked. Others may allow individual rows within a table to be locked. Others may have larger lockable data containers. The present invention is not limited to any particular granularity of lockable blocks.

When a transaction specifies an operation that changes data contained within a given block, the transaction must first place a write lock on the block before performing the specified operation. Prior to placing a lock on a block, transactions first determine whether a write lock has been placed on the block by another transaction. If a write lock is already present, then the transaction is prevented from obtaining its own write lock on the block, and therefore from performing the operation.

In a system that allows an index to contain more than one occurrence of the same value, the locking mechanism described above does not prevent all undesirable interactions. The difficulty is that multiple index entries for the same index value may be spread across more than one data block. Consequently, establishing a write lock on a block before writing, updating, or deleting a value does not necessarily prevent another transaction from inserting, updating or deleting the same value (for another row) in another block. If two or more transactions are allowed to concurrently perform operations that delete, insert or update different instances of the same value, the non-uniqueness count mechanism described above can become corrupted.

For example, assume that two transactions concurrently attempt to insert the name "Iverson" in an index that currently contains one instance of the name "Iverson". Both transactions may scan the index to determine that one occurrence of the name "Iverson" already exists in the index. The first transaction may place a write lock on one block to insert its entry for the name "Iverson", while the second transaction puts a write lock on another block to insert its entry for the name "Iverson", Neither transaction blocks the other transaction, so both transactions insert their respective entries for the name "Iverson", In addition, both transactions will increment the non-uniqueness count associated with the index because both transactions believe that they are inserting the second occurrence of the name "Iverson" into the index. Because the non-uniqueness count for the index will have been incremented twice for a single index value, the non-uniqueness count will no longer reflect the current state of the index.

Similar problems arise for deletion operations. For example, assume that two transactions concurrently attempt to delete the same value from an index that contains two entries for the value. Both transactions will scan the index to determine that there are two entries for the value in question. The two transactions may establish write locks on two different blocks, where each of the two blocks contains a different entry for the value. When the transactions concurrently delete their respective entries of the value, they will also decrement the non-uniqueness count of the index. Because the non-uniqueness count is decremented twice for the same index value, it will no longer accurately reflect the current state of the index.

According to one embodiment of the invention, the problems that arise from concurrent accesses to different blocks for the same index value are prevented by requiring a transaction to place a write lock on all blocks that could possibly store an entry for the value in question. If a transaction has write locks on all of the blocks that could possibly contain entries for a particular index value, then it is impossible for another transaction to concurrently perform an operation that deletes, inserts or updates an entry that contains the value. However, by increasing the number of write locks required to perform any given operation, the number of deadlocks and pauses within a DBMS will increase.

According to an alternative embodiment of the invention, corruption of the non-uniqueness count is prevented without requiring that a lock be obtained on all possible blocks. Rather, undesired interaction by concurrent transactions is prevented through use of an invariant. In one embodiment, the invariant that is used is the location of the first already-existing entry of the value.

For the purposes of explanation, the notation <k||rowid> will be used to represent an entry in an index, where k is the data value portion of the entry and rowid is the unique identifier of the row that corresponds to the entry. Techniques for preventing corruption of the non-uniqueness count during an insert operation shall now be described in greater detail with reference to FIGS. 4. Techniques for preventing corruption of the non-uniqueness count during a deletion operation shall be described below with reference to FIG. 5.

Insertion Operations

Figure 4:
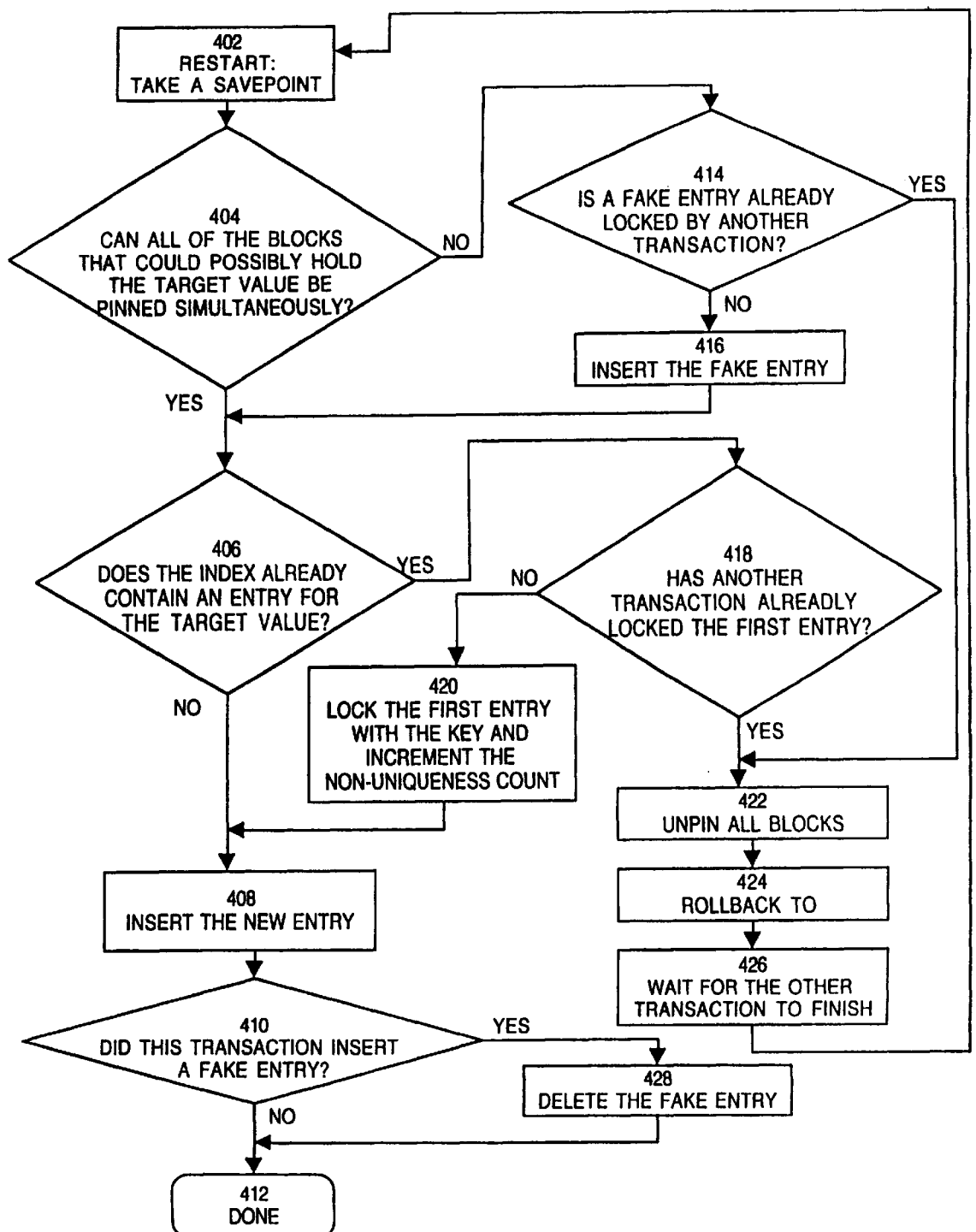
FIG. 4 is a flow chart illustrating the steps for inserting an entry for a target value in a uniqueness-required index.

Referring to FIG. 4, it illustrates steps for inserting data into a database in a manner that prevents the non-uniqueness count from being corrupted by concurrently executing transactions. For the purposes of explanation, the following terms shall be used. The transaction attempting to insert an entry shall be referred to as the "current transaction." The value to be inserted shall be referred to as the "target value". A lock that prevents other transactions from accessing a block shall be referred to as a "pin". A lock that prevents other transactions from accessing a n entry shall be referred to as a "lock".

Also for the purposes of explanation, it shall be assumed that transactions are configured to always obtain a pin on the block that they are accessing. When a transaction desires to access another block, the transaction releases the pin on the current block and requests a pin on the new block. The transaction then waits for the pin on the new block to be granted to the transaction before accessing the new block. Typical database systems allow a transaction to hold numerous locks at a time but only one pin at a time. Transactions are typically configured to hold a lock on all entries that they insert.

At step 402, the current transaction establishes a savepoint. All operations performed by the current transaction after the establishment of the savepoint shall be undone if the current transaction is rolled back.

At step 404, it is determined whether all of the blocks that could possibly hold the target value can be pinned simultaneously by the current transaction. In systems that allow a transaction to pin a single block, this determination would be made based on the entries that are already contained in the block into which the current entry of the target value would be inserted. Specifically, if the block contains entries that contain index values that fall on each side of the target value, then all entries for the target value would be inserted into that block. For example, if the target value is "Fred" and the block into which the current entry for the target value should be inserted already contains entries for the index values "Frank" and "Frederick", then all entries for the target value "Fred" would be inserted into the block at issue. When this is the case, control passes from step 404 to step 406. Otherwise, control passes from step 404 to step 414.

At step 414, it is determined whether the index already contains a fake entry for the target value. According to one embodiment of the invention, the fake entry is <Target Value||0>. That is, an entry for the target value that specifies a rowid of 0. This fake entry is used because, in indexes in which entries for the same value are ordered based on rowid, this entry will always be the first entry relative to any other entries for the target value. If a fake entry for the target value is locked by another transaction, then control passes to step 422. Otherwise, the current transaction inserts the fake entry at step 416 and proceeds to step 406.

At step 406, it is determined whether the index already contains an entry for the target value. If the index contains an entry for the target value, control proceeds to step 418. Otherwise, control proceeds to step 408.

Within the index, entries that contain the same value are stored in an order. For example, in one embodiment, entries that have the same value are stored based on the order of the rows that correspond to the entries. For example, the entry <Fred∥30> would be stored in the index between the entries <Fred∥20> and <Fred∥60>. Because entries for a value are stored in an order, one of the entries for the target value already contained in the index will be a "first entry" with respect to the order. At step 418, it is determined whether the first entry for the target value is locked by another transaction. If the first entry is not locked, control proceeds to step 420. Otherwise, control proceeds to step 422.

At step 420, the current transaction locks the first entry for the target value (other than any fake entry). During this step the current transaction also increments the non-uniqueness count if appropriate. For example, in an embodiment in which the non-uniqueness count reflects the total number of duplicates in an index, the current transaction will always increment the non-uniqueness count at step 420.

In an embodiment in which the non-uniqueness count reflects the number of index values that are duplicated, the current transaction first determines whether the index contains exactly one pre-existing non-fake entry for the target value. If the index contains exactly one pre-existing non-fake entry for the target value, then the entry to be inserted will be the first duplicate entry for the target value, so the current transaction increments the non-uniqueness count. If the index contains more than one pre-existing non-fake entry, the current transaction does not increment the non-uniqueness count.

After step 420, control proceeds to step 408. At step 408, the current transaction inserts the new entry. At step 410, it is determined whether the current transaction inserted a fake entry. If the current transaction did not insert a fake entry, then the insert operation is done (step 412). Otherwise, the current transaction deletes the fake entry at step 428 and is done (step 412).

Control passes to step 422 when some condition exists that does not allow the current transaction to proceed with the insertion process. At step 422, the current transaction releases any pins that it holds. At step 424, the current transaction is rolled-back to the savepoint. At step 426 the current transaction waits for the transaction that blocked the current transaction to finish. When the blocking transaction finishes, the current transaction makes another attempt to perform the insert operation, beginning at step 402.

In the insertion process described above, the current transaction prevents concurrent transactions from concurrently adding entries that contain the target value by locking the block that contains the first existing entry for the target value. If there is no first existing entry, then the process adds and locks a fake entry <target value∥0>. However, it is not necessary to both add the fake entry and pin the block containing the fake entry.

For example, in one embodiment, the fake entry is added, but the block containing the fake entry is not pinned. If a concurrently executing transaction desires to add an entry for the target value, it will first attempt to add the fake entry. Prior to adding the fake entry, the transaction will detect that another transaction (the present transaction) has already added the fake entry.

According to another embodiment, the block that would contain the fake entry is pinned by the current transaction, but no fake entry is added. If a concurrently executing transaction desires to add an entry for the target value, it will first attempt to obtain a pin on the block into which the fake entry <target value∥10> would be inserted. The transaction will detect that another transaction (the current transaction) already holds a pin on the block at issue.

Deletion Operations

Figure 5:
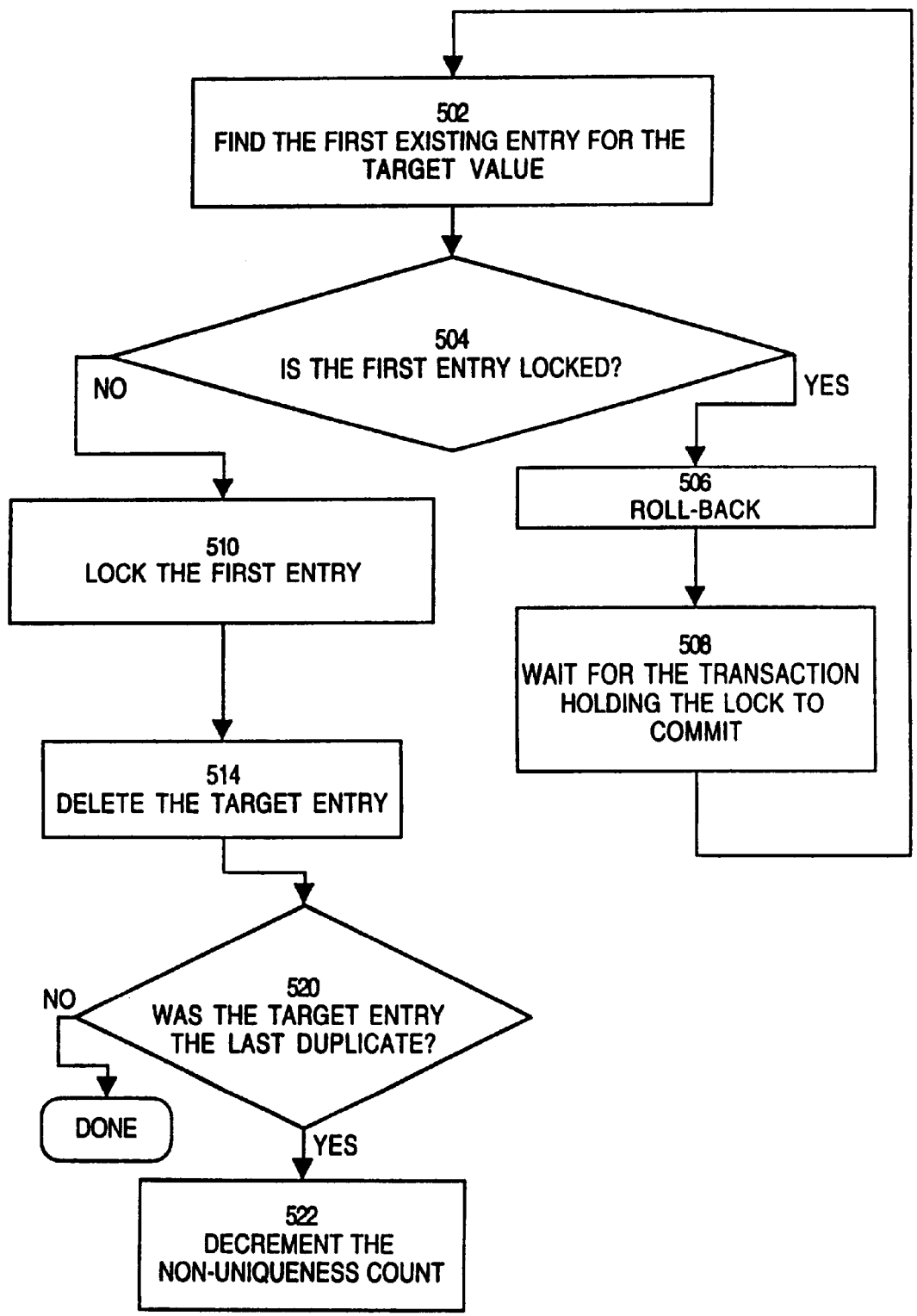
FIG. 5 is a flow chart illustrating the steps for deleting an entry of a target value in a uniqueness-required index.

Referring to FIG. 5 it is a flow chart illustrating the steps for deleting an entry containing the target value (the "target entry") from a uniqueness-required index, according to an embodiment of the invention. At step 502, the first entry in the index that contains the target value is determined. As explained above, "first" in this context refers to the order in which entries associated with the same target value are stored within the index.

At step 504, it is determined whether the first entry for the target value is locked. If the first entry for the target value is locked, control proceeds to step 506. Otherwise, control proceeds to step 510.

At step 506, the current transaction rolls back. At step 508, the current transaction waits for the transaction that holds the lock on the first entry to commit. When the transaction in question commits, the current transaction returns to step 502 to attempt the deletion operation again.

At step 510, the current transaction places a lock on the first entry. As an alternative to locking the first entry of the target value prior to deleting a target entry, the current transaction could obtain a pin on the block in which the first entry resides.

At step 514, the target entry is deleted. At step 520, it is determined whether the target entry was the last duplicate of the target value in the index. The target entry is the last duplicate if the index contained exactly two entries containing the target value prior to deleting the target entry. If the target entry was the last duplicate of the target value, then control proceeds to step 522 where the non-uniqueness count of the index is decremented.

In the embodiments described above, the non-uniqueness count of a table is incremented ever time an entry a first duplicate entry of a value is added to an index. However, this is simply one mechanism for maintaining the non-uniqueness count. According to an alternative embodiment, the non-uniqueness count is incremented every time a duplicate entry is added to the index, even if the duplicate entry for the value is already present in the index.

Figure 6:
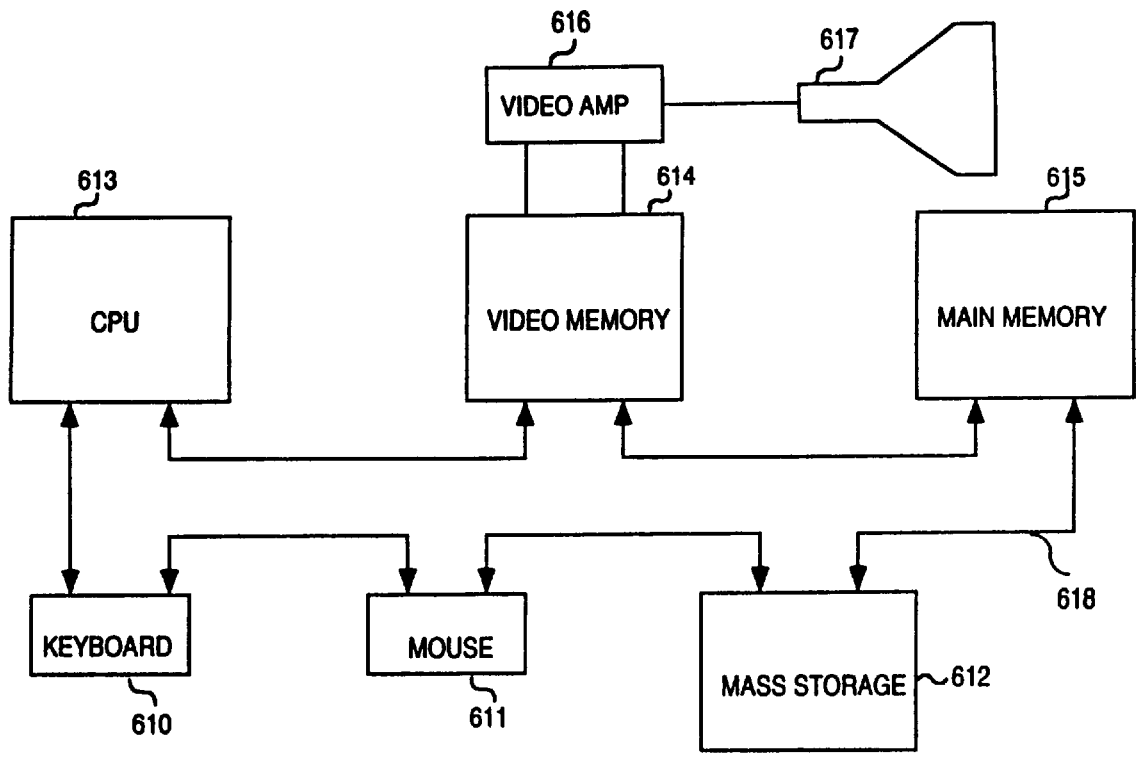
FIG. 6 is a block diagram of a computer system capable of implementing the present invention.

The present invention can be implemented on a general purpose computer such as illustrated in FIG. 6. A keyboard 610 and mouse 611 are coupled to a bi-directional system bus 618. The keyboard and mouse are for introducing user input to the computer system and communicating that user input to CPU 613. The computer system of FIG. 6 also includes a video memory 614, main memory 615 and mass storage 612, all coupled to bi-directional system bus 618 long with keyboard 610, mouse 611 and CPU 613. The mass storage 612 may include both fixed and removable media, such as magnetic, optical or magnetic optical storage systems or any other available mass storage technology. Bus 618 may contain, for example, 32 address lines for addressing video memory 614 or main memory 615. The system bus 618 also includes, for example, a 32-bit DATA bus for transferring DATA between and among the components, such as CPU 613, main memory 615, video memory 614 and mass storage 612. Alternatively, multiplex DATA/address lines may be used instead of separate DATA and address lines.

In the preferred embodiment of this invention, the CPU 613 is a 32-bit microprocessor manufactured by Motorola Inc., such as the 680X0 processor or a microprocessor manufactured by Intel Corporation, such as the 80X86, or Pentium® processor. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable means. This circuitry converts pixel DATA stored in video memory 614 to a raster signal suitable for use by monitor 617. Monitor 617 is a type of monitor suitable for displaying graphic images.

The computer system described above is for purposes of example only. The present invention may be implemented in any type of computer system or programming or processing environment.

The present invention is described above in connection with deferred constraint enforcement of uniqueness constraint in a DBMS. However, the present invention can be used to enforce uniqueness in other contexts. The present invention uses an original store (i.e., the storage for original occurrences) as a workspace to store duplicate occurrences and maintains a count of the number of original occurrences that are duplicated in the original store. This functionality can be used to manage queues, or to schedule transactions with a DBMS. Applications that allocate resources can use the present invention to ensure that multiple allocations or assignments of the same resource are not made. Examples of such applications include airline reservation and hotel room assignments.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of enforcing a uniqueness constraint on a set of values stored in a database, said set of values capable of having one or more duplicate occurrences of a value in said set, the method comprising the steps of:

executing in said database, an operation that modifies one or more values in said set of values;

maintaining a count based on how many duplicate values are produced in said set of values as a result of execution of said operation; and after execution of said operation, undoing the effects of said operation if said count indicates that execution of said operation caused at least one duplicated value to remain in said set of values after execution of said operation.

2. The method of claim 1 wherein said step of maintaining a count comprises the steps of:

incrementing said count when a duplicate occurrence of a value is added to said set of values during execution of said operation; and decrementing said count when a duplicate occurrence of a value is deleted from said set of values during execution of said operation.

3. The method of claim 1 wherein said step of maintaining a count comprises the steps of:

incrementing said count only when a first duplicate occurrence of a value is added to said set of values during execution of said operation; and decrementing said count only when a last duplicate occurrence of a value is deleted from said set of values during execution of said operation.

4. A method of enforcing a uniqueness constraint on data in a database management system (DBMS), the method comprising the steps of:

creating within said DBMS, an index capable of storing a plurality of first index entries and a plurality of duplicate occurrences of said plurality of first index entries;

executing, in said DBMS, an operation to perform an update of said index;

modifying a count during execution of said operation in response to additions and deletions of duplicate occurrences of said plurality of first index entries by incrementing said count based only on first additions of duplicate occurrences during execution of said operation, and by decrementing said count based only on last deletions of duplicate occurrences during execution of said operation; and after execution of said operation, removing said update to said index if said count indicates that any duplicate occurrences of said plurality of first index entries remain in said index.

5. The method of claim 4 wherein:

the method further comprises the steps of initializing in said DBMS, said count for said index to a predetermined value prior to executing said operation; and the step of removing said update is performed if said count for said index is not equal to said predetermined value after execution of said operation.

6. The method of claim 4 wherein:

the method further comprises the steps of creating said count in said DBMS when a first duplicate occurrence of said plurality of index entries is added to said index during execution of said operation;

deleting said count from said DBMS when a last duplicate occurrence is removed from said index; and the step of removing said update is performed if after execution of said operation said count has not been deleted.

7. The method of claim 4 wherein the step of modifying said count includes the steps of:

decrementing said count only when said operation eliminates all of said plurality of duplicate occurrences of one of said plurality of first index entries; and incrementing said count only when said operation creates a first duplicate occurrence of one of said plurality of first index entries and only when no duplicate occurrences of said one of said plurality of first index entries previously exists.

8. A method of enforcing a uniqueness constraint on data in a database management system (DBMS) having a plurality of indexes, each index having a plurality of index entries, the method comprising the steps of:

initializing in said DBMS a tracking means for tracking how many of said plurality of indexes contain duplicate entries;

executing in said DBMS an operation to update one or more of said plurality of indexes;

updating said tracking means during execution of said operation by performing the steps of updating said tracking means to indicate that an index that was previously unique has become non-unique only when said operation causes insertion of a duplicate entry in one of said plurality of indexes that does not already have any duplicate entries of any index entries; and updating said tracking means to indicate that an index that was previously non-unique has become unique only when said operation causes deletion of a last duplicate entry in one of said plurality of indexes;

after execution of said operation, performing the steps of examining said tracking means; and removing said modifications to said one or more of said plurality of indexes only when said tracking means indicates that said one or more of said plurality of indexes contains a duplicate entry.

9. The method of claim 8 wherein:

said tracking means is a count of how many first duplicate entries are in said plurality of indexes;

said step of updating said tracking means is performed by changing said count;

said step of updating said tracking means to indicate that an index that was previously unique has become non-unique includes the step of incrementing said count only when a first duplicate entry is added to said index during execution of said operation; and said step of updating said tracking means to indicate that an index that was previously non-unique has become unique includes the step of decrementing said count only when a last duplicate entry is removed from said index during execution of said operation.

10. The method of claim 8 wherein:

said tracking means is a list;

said step of updating said tracking means includes updating said list by performing the steps of adding a non-uniqueness count to said list only when a duplicate entry is added to one of said plurality of indexes that previously did not have any duplicate entries by execution of said operation; and removing a non-uniqueness count from said list only when a last duplicate entry is removed from one of said plurality of indexes that previously had at least one duplicate entry by execution of said operation.

11. The method of claim 9 wherein said step of changing said count further comprises the steps of:

maintaining a plurality of non-uniqueness counts, wherein each of said plurality of non-uniqueness counts corresponds to one of said plurality of indexes and reflects whether the corresponding index has at least one duplicate entry; and changing said count to reflect how many of said non-uniqueness counts currently indicate that their corresponding indexes have at least one duplicate entry.

12. The method of claim 11 wherein said step of maintaining a plurality of non-uniqueness counts further comprises the following steps for each of said plurality of indexes:

incrementing said non-uniqueness count for said index only when said operation creates a first duplicate entry of an index entry in said index; and decrementing said non-uniqueness count for said index only when said operation eliminates a last duplicate entry of an index entry in said index.

13. A method of maintaining a uniqueness constraint on indexed data values in a database management system (DBMS), the method comprising the steps of:

creating in said DBMS an index capable of storing a plurality of index entries for any given indexed data value, said index initially containing no more than one entry for any given indexed data value;

executing in said DBMS a first operation;

inserting in said index a duplicate index entry when said first operation creates a duplicate of one of said indexed data values;

deleting in said index a duplicate index entry when said first operation deletes a duplicate of one of said indexed data values;

changing a count only in response to inserting a first duplicate index entry in said index and deleting a last duplicate index entry from said index; and executing in said DBMS a second operation to remove modifications to said index caused by said first operation only when said count indicates that said index has at least one duplicate entry after execution of said first operation.

14. The method of claim 13 wherein said step of executing said first operation further comprises the steps of:

searching said index to locate one of said indexed data values in said DBMS; and performing said operation on said one of said indexed data values in said DBMS.

* * * * *